United States Patent
Richardson et al.

(10) Patent No.: US 12,452,205 B2
(45) Date of Patent: *Oct. 21, 2025

(54) REQUEST ROUTING BASED ON CLASS

(71) Applicant: Amazon Technologies, Inc., Seattle, WA (US)

(72) Inventors: David R. Richardson, Seattle, WA (US); Swaminathan Sivasubramanian, Medina, WA (US); Bradley Eugene Marshall, Bainbridge Island, WA (US); Christopher L. Scofield, Seattle, WA (US); Elmore Eugene Pope, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,072

(22) Filed: Jan. 8, 2024

(65) Prior Publication Data
US 2024/0406106 A1    Dec. 5, 2024

Related U.S. Application Data

(63) Continuation of application No. 17/933,433, filed on Sep. 19, 2022, now Pat. No. 11,909,639, which is a
(Continued)

(51) Int. Cl.
*H04L 61/4511*    (2022.01)
*H04L 45/00*     (2022.01)
(Continued)

(52) U.S. Cl.
CPC .......... *H04L 61/4511* (2022.05); *H04L 45/70* (2013.01); *H04L 45/72* (2013.01);
(Continued)

(58) Field of Classification Search
None
See application file for complete search history.

(56) References Cited

U.S. PATENT DOCUMENTS

| 1,075,551 A | 10/1913 | D'Amours |
| 5,063,500 A | 11/1991 | Shorter |

(Continued)

FOREIGN PATENT DOCUMENTS

| CA | 2741 895 A1 | 5/2010 |
| CA | 2765397 A1 | 2/2011 |

(Continued)

OTHER PUBLICATIONS

"Non-Final Office Action dated Jan. 3, 2012," U.S. Appl. No. 12/652,541; Jan. 3, 2012; 35 pages.
(Continued)

*Primary Examiner* — Lashonda Jacobs-Burton
(74) *Attorney, Agent, or Firm* — Knobbe, Martens, Olson & Bear, LLP

(57) ABSTRACT

A system and method for management and processing of resource requests is provided. A content delivery network service provider receives a DNS query from a client computing device. The DNS query corresponds to a requested resource from the client computing device. The content delivery network service provider associates the client computing device with a cluster of other client computing devices. Based on routing information for the cluster, the content delivery network service provider routes the DNS query. The process can further include monitoring performance data associated with the delivery of the requested resource and updating the routing information for the cluster based on the performance data for use in processing subsequent requests from client computing devices in the cluster.

20 Claims, 10 Drawing Sheets

Related U.S. Application Data continuation of application No. 16/948,889, filed on Oct. 5, 2020, now Pat. No. 11,451,472, which is a continuation of application No. 16/405,779, filed on May 7, 2019, now Pat. No. 10,797,995, which is a continuation of application No. 15/888,860, filed on Feb. 5, 2018, now Pat. No. 10,305,797, which is a continuation of application No. 15/408,362, filed on Jan. 17, 2017, now Pat. No. 9,887,915, which is a continuation of application No. 14/263,824, filed on Apr. 28, 2014, now Pat. No. 9,571,389, which is a continuation of application No. 13/766,574, filed on Feb. 13, 2013, now Pat. No. 8,713,156, which is a continuation of application No. 13/418,239, filed on Mar. 12, 2012, now Pat. No. 8,386,596, which is a continuation of application No. 13/098,366, filed on Apr. 29, 2011, now Pat. No. 8,135,820, which is a continuation of application No. 12/060,173, filed on Mar. 31, 2008, now Pat. No. 7,962,597.

(51) Int. Cl.
*H04L 67/02* (2022.01)
*H04L 67/025* (2022.01)
*H04L 67/06* (2022.01)
*H04L 67/10* (2022.01)
*H04L 67/63* (2022.01)

(52) U.S. Cl.
CPC ............ *H04L 67/02* (2013.01); *H04L 67/025* (2013.01); *H04L 67/06* (2013.01); *H04L 67/10* (2013.01); *H04L 67/63* (2022.05)

(56) References Cited

U.S. PATENT DOCUMENTS

| | | |
|---|---|---|
| 5,341,477 A * | 8/1994 | Pitkin .................. G06F 9/5055 709/227 |
| 5,459,837 A | 10/1995 | Caccavale |
| 5,611,049 A | 3/1997 | Pitts |
| 5,627,889 A | 5/1997 | Eslambolchi |
| 5,701,467 A | 12/1997 | Freeston |
| 5,764,910 A | 6/1998 | Shachar |
| 5,774,660 A * | 6/1998 | Brendel .............. H04L 67/1014 709/239 |
| 5,815,649 A | 9/1998 | Utter et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,991,809 A | 11/1999 | Kriegsman |
| 5,999,274 A | 12/1999 | Lee et al. |
| 6,006,264 A | 12/1999 | Colby et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,178,160 B1 | 1/2001 | Bolton et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,209 B1 | 4/2001 | Watson et al. |
| 6,223,288 B1 | 4/2001 | Byrne |
| 6,243,761 B1 | 6/2001 | Mogul et al. |
| 6,256,671 B1 | 7/2001 | Strentzsch et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Mullins |
| 6,389,532 B1 | 5/2002 | Gupta et al. |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,513,112 B1 | 1/2003 | Craig et al. |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Lewin et al. |
| 6,560,610 B1 | 5/2003 | Eatherton et al. |
| 6,564,380 B1 | 5/2003 | Murphy |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 2/2004 | Adrangi et al. |
| 6,694,358 B1 | 2/2004 | Swildens et al. |
| 6,697,805 B1 | 2/2004 | Choquier et al. |
| 6,718,324 B2 | 4/2004 | Edlund et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |

(56) References Cited

U.S. PATENT DOCUMENTS

| | | | |
|---|---|---|---|
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,944,167 B1 | 9/2005 | McPherson |
| 6,950,848 B1 | 9/2005 | Yousefi'zadeh et al. |
| 6,961,783 B1 | 11/2005 | Cook et al. |
| 6,963,850 B1 | 11/2005 | Bezos et al. |
| 6,968,389 B1 | 11/2005 | Menditto et al. |
| 6,976,090 B2 | 12/2005 | Ben-Shaul et al. |
| 6,981,017 B1 | 12/2005 | Kasriel et al. |
| 6,981,025 B1 | 12/2005 | Frazier et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Lyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,095,715 B2 | 8/2006 | Buckman et al. |
| 7,096,266 B2 | 8/2006 | Lewin et al. |
| 7,099,936 B2 | 8/2006 | Chase et al. |
| 7,103,645 B2 * | 9/2006 | Leighton | H04L 67/568 |
| | | | 709/219 |
| 7,114,160 B2 | 9/2006 | Suryanarayana et al. |
| 7,117,262 B2 | 10/2006 | Bai et al. |
| 7,133,905 B2 * | 11/2006 | Dilley | H04L 67/564 |
| | | | 711/122 |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,747 B1 | 12/2006 | Cheng et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,165,117 B1 | 1/2007 | Sitaraman et al. |
| 7,171,469 B2 | 1/2007 | Ackaouy et al. |
| 7,174,382 B2 | 2/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,200,673 B1 | 4/2007 | Augart |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 * | 7/2007 | Wein | H04L 67/1001 |
| | | | 709/214 |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,634 B1 | 8/2007 | Davis et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,302,608 B1 | 11/2007 | Acharya et al. |
| 7,308,499 B2 | 12/2007 | Chavez |
| 7,310,686 B2 * | 12/2007 | Uysal | H04L 67/51 |
| | | | 709/245 |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 4/2008 | Taft et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,451,230 B2 | 11/2008 | Corrado et al. |
| 7,454,457 B1 | 11/2008 | Lowery et al. |
| 7,454,500 B1 | 11/2008 | Hsu et al. |
| 7,461,170 B1 * | 12/2008 | Taylor | H04L 61/30 |
| | | | 709/219 |
| 7,464,142 B2 | 12/2008 | Flurry et al. |
| 7,472,201 B1 | 12/2008 | Aitken |
| 7,478,148 B2 | 1/2009 | Neerdaels |
| 7,492,720 B2 * | 2/2009 | Pruthi | H04L 41/22 |
| | | | 709/224 |
| 7,496,651 B1 | 2/2009 | Joshi |
| 7,499,998 B2 | 3/2009 | Toebes et al. |
| 7,502,836 B1 * | 3/2009 | Menditto | H04L 67/568 |
| | | | 709/217 |
| 7,505,464 B2 | 3/2009 | Okmianski et al. |
| 7,506,034 B2 | 3/2009 | Coates et al. |
| 7,519,705 B1 | 4/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 * | 6/2009 | Chase | H04L 67/563 |
| | | | 709/224 |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,584,507 B1 | 9/2009 | Nucci |
| 7,593,935 B2 | 9/2009 | Sullivan |
| 7,594,189 B1 | 9/2009 | Walker et al. |

(56) References Cited

U.S. PATENT DOCUMENTS

| | | |
|---|---|---|
| 7,596,619 B2 | 9/2009 | Leighton et al. |
| 7,603,439 B2 | 10/2009 | Dilley et al. |
| 7,613,815 B1 | 11/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,626,940 B2 | 12/2009 | Jain |
| 7,640,296 B2 | 12/2009 | Fuchs et al. |
| 7,650,376 B1 | 1/2010 | Blumenau |
| 7,653,689 B1 | 1/2010 | Champagne et al. |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,251 B2 | 3/2010 | Houlihan et al. |
| 7,685,270 B1 | 3/2010 | Vermeulen et al. |
| 7,685,273 B1 | 3/2010 | Anastas et al. |
| 7,693,959 B2 | 4/2010 | Leighton et al. |
| 7,698,418 B2 | 4/2010 | Shimada et al. |
| 7,706,740 B2 | 4/2010 | Collins et al. |
| 7,707,071 B2 | 4/2010 | Rigole |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,725,658 B2 | 5/2010 | Lang et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,756,032 B2 | 7/2010 | Feick et al. |
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,680 B2 | 12/2010 | Phatak |
| 7,853,719 B1 | 12/2010 | Cao et al. |
| 7,860,735 B2 | 12/2010 | Evanitsky |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,890,989 B1 | 2/2011 | Hofrichter et al. |
| 7,899,899 B2 | 3/2011 | Joshi |
| 7,904,875 B2 | 3/2011 | Hegyi |
| 7,912,921 B2* | 3/2011 | O'Rourke ............ H04L 67/5682 709/219 |
| 7,925,713 B1 | 4/2011 | Day et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 5/2011 | McGrath |
| 7,945,693 B2 | 5/2011 | Farber et al. |
| 7,949,779 B2 | 5/2011 | Farber et al. |
| 7,949,785 B2 | 5/2011 | Alkhatib et al. |
| 7,958,222 B1 | 6/2011 | Pruitt et al. |
| 7,958,258 B2 | 6/2011 | Yeung et al. |
| 7,961,736 B2 | 6/2011 | Ayyagari |
| 7,962,597 B2* | 6/2011 | Richardson ............ H04L 45/72 709/224 |
| 7,966,404 B2 | 6/2011 | Hedin et al. |
| 7,970,816 B2 | 6/2011 | Chess et al. |
| 7,970,940 B1 | 6/2011 | Van de Ven et al. |
| 7,979,509 B1 | 7/2011 | Malmskog et al. |
| 7,991,910 B2 | 8/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,705 B1 | 8/2011 | Sebastian et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 11/2011 | Baumback et al. |
| 8,069,231 B2 | 11/2011 | Schran et al. |
| 8,073,940 B1 | 12/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,155,126 B1 | 4/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,180,720 B1 | 5/2012 | Kovacs et al. |
| 8,190,682 B2 | 5/2012 | Paterson-Jones et al. |
| 8,195,605 B2 | 6/2012 | Chellappa et al. |
| 8,195,837 B2 | 6/2012 | McCarthy et al. |
| 8,209,695 B1 | 6/2012 | Pruyne et al. |
| 8,218,965 B1 | 7/2012 | Uhlhorn et al. |
| 8,219,647 B2 | 7/2012 | Harvell et al. |
| 8,224,942 B1 | 7/2012 | Presotto et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 9/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,286,176 B1 | 10/2012 | Baumback et al. |
| 8,291,117 B1 | 10/2012 | Eggleston et al. |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,301,600 B1 | 10/2012 | Helmick et al. |
| 8,301,645 B1 | 10/2012 | Crook |
| 8,316,124 B1 | 11/2012 | Baumback et al. |
| 8,321,588 B2 | 11/2012 | Richardson et al. |
| 8,331,370 B2 | 12/2012 | Hamilton et al. |
| 8,341,745 B1 | 12/2012 | Chat et al. |
| 8,380,831 B2 | 2/2013 | Barber |
| 8,380,851 B2 | 2/2013 | McCarthy et al. |
| 8,392,928 B1 | 3/2013 | Forys et al. |
| 8,396,908 B2 | 3/2013 | Moore et al. |
| 8,402,137 B2 | 3/2013 | Sivasuramanian et al. |

(56) References Cited

U.S. PATENT DOCUMENTS

| | | |
|---|---|---|
| 8,423,408 B1 | 4/2013 | Barnes et al. |
| 8,423,662 B1 | 4/2013 | Weihl et al. |
| 8,423,667 B2 | 4/2013 | Richardson et al. |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,854 B1 | 5/2013 | Jasinskyj |
| 8,447,876 B2 | 5/2013 | Verma et al. |
| 8,452,870 B2 | 5/2013 | Baumback et al. |
| 8,452,874 B2 | 5/2013 | MacCarthaigh et al. |
| 8,458,360 B2 | 6/2013 | Richardson et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,883 B2 | 7/2013 | Day et al. |
| 8,478,903 B2 | 7/2013 | Farber et al. |
| 8,489,737 B2 | 7/2013 | Baumback et al. |
| 8,504,775 B2 | 8/2013 | Plamondon |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,963 B2 | 11/2013 | Trahan et al. |
| 8,589,996 B2 | 11/2013 | Ma et al. |
| 8,606,926 B2 | 12/2013 | Ulevitch |
| 8,606,996 B2 | 12/2013 | Richardson et al. |
| 8,612,565 B2 | 12/2013 | Schneider |
| 8,612,588 B1 | 12/2013 | Ehrlich et al. |
| 8,615,549 B2 | 12/2013 | Knowles et al. |
| 8,619,780 B1 | 12/2013 | Brandwine |
| 8,626,950 B1 | 1/2014 | MacCarthaigh et al. |
| 8,631,481 B2 | 1/2014 | Fromentoux et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,645,700 B2 | 2/2014 | Smith et al. |
| 8,667,127 B2 | 3/2014 | Bettis et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,694,642 B2 | 4/2014 | Dempsky et al. |
| 8,712,950 B2 | 4/2014 | Smith et al. |
| 8,732,309 B1 | 5/2014 | Richardson et al. |
| 8,738,766 B1 | 5/2014 | Kazerani et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 8/2014 | Sorenson, III et al. |
| 8,819,187 B1 | 8/2014 | Hofmann |
| 8,819,283 B2 | 8/2014 | Richardson et al. |
| 8,826,032 B1 | 9/2014 | Yahalom et al. |
| 8,843,625 B2 | 9/2014 | Baumback et al. |
| 8,902,897 B2 | 12/2014 | Hamilton et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,466 B2 | 12/2014 | Seed et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,971,328 B2 | 3/2015 | Judge et al. |
| 8,976,711 B2 | 3/2015 | Li et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,071,502 B2 | 6/2015 | Baumback et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,092,141 B2 | 7/2015 | Hayashi |
| 9,116,803 B1 | 8/2015 | Agrawal et al. |
| 9,118,543 B2 | 8/2015 | Baumback et al. |
| 9,130,756 B2 | 9/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 10/2015 | Watson |
| 9,160,641 B2 | 10/2015 | Baumback et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,099 B2 | 12/2015 | Baumback et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,282,032 B2 | 3/2016 | Judge et al. |
| 9,300,535 B2 | 3/2016 | Popli et al. |
| 9,332,078 B2 | 5/2016 | Sivasubramanian et al. |
| 9,367,929 B2 | 6/2016 | Bettis et al. |
| 9,391,949 B1 | 7/2016 | Richardson et al. |
| 9,407,539 B1 | 8/2016 | Dickinson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,491,073 B2 | 11/2016 | Baumback et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,388 B1 | 1/2017 | Li et al. |
| 9,544,394 B2 | 1/2017 | Richardson et al. |
| 9,571,389 B2 | 2/2017 | Richardson et al. |
| 9,575,808 B1 | 2/2017 | Yamala et al. |
| 9,584,328 B1 | 2/2017 | Graham-Cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,403 B2 | 4/2017 | Baumback et al. |
| 9,628,554 B2 | 4/2017 | Marshall et al. |
| 9,645,808 B1 | 5/2017 | Turpie |

(56) References Cited

U.S. PATENT DOCUMENTS

| | | |
|---|---|---|
| 9,660,890 B2 | 5/2017 | Baumback et al. |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,769,248 B1 | 9/2017 | Krishnan et al. |
| 9,787,599 B2 | 10/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,825,831 B2 | 11/2017 | Baumback et al. |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 9,996,501 B1 | 6/2018 | Nelson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,027,739 B1 | 7/2018 | Krishnan et al. |
| 10,033,691 B1 | 7/2018 | Mizik et al. |
| 10,033,699 B2 | 7/2018 | Sullivan et al. |
| 10,048,974 B1 | 8/2018 | Wagner et al. |
| 10,049,051 B1 | 8/2018 | Baldwin |
| 10,063,459 B2 | 8/2018 | Judge et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B1 | 10/2018 | Baumback et al. |
| 10,116,584 B2 | 10/2018 | Richardson et al. |
| 10,135,620 B2 | 11/2018 | Richardson et al. |
| 10,148,542 B2 | 12/2018 | Baumback et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,204,041 B2 | 2/2019 | Allen et al. |
| 10,205,644 B2 | 2/2019 | Baumback et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,225,365 B1 | 3/2019 | Hotchkies et al. |
| 10,257,307 B1 | 4/2019 | Baldwin |
| 10,264,062 B2 | 4/2019 | Richardson et al. |
| 10,270,878 B2 | 4/2019 | Uppal et al. |
| 10,284,446 B2 | 5/2019 | Baumback et al. |
| 10,311,371 B1 | 6/2019 | Hotchkies et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,430,084 B2 | 10/2019 | Goss et al. |
| 10,462,025 B2 | 10/2019 | Baumback et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 10,630,771 B1 | 4/2020 | Garza et al. |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,728,133 B2 | 7/2020 | Howard et al. |
| 10,742,550 B2 | 8/2020 | Richardson et al. |
| 10,742,593 B1 | 8/2020 | Vasquez et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Navaneetha et al. |
| 10,812,846 B1 | 10/2020 | Vantalon et al. |
| 10,831,549 B1 | 11/2020 | Radhakrishnan et al. |
| 10,931,738 B2 | 2/2021 | Radhakrishnan et al. |
| 10,938,884 B1 | 3/2021 | Baldwin et al. |
| 10,958,501 B1 | 3/2021 | Richardson et al. |
| 11,025,747 B1 | 6/2021 | Keogh |
| 11,108,729 B2 | 8/2021 | Richardson et al. |
| 11,115,500 B2 | 9/2021 | Richardson et al. |
| 11,134,134 B2 | 9/2021 | Uppal et al. |
| 11,194,719 B2 | 12/2021 | Richardson et al. |
| 11,205,037 B2 | 12/2021 | Hollis et al. |
| 11,245,770 B2 | 2/2022 | Sivasubramanian et al. |
| 11,283,715 B2 | 3/2022 | Richardson et al. |
| 11,290,418 B2 | 3/2022 | Vasquez et al. |
| 11,297,140 B2 | 4/2022 | Puchala et al. |
| 11,303,717 B2 | 4/2022 | Watson |
| 11,330,008 B2 | 5/2022 | Uppal et al. |
| 11,336,712 B2 | 5/2022 | Richardson et al. |
| 11,362,986 B2 | 6/2022 | Thunga et al. |
| 11,381,487 B2 | 7/2022 | Howard et al. |
| 11,457,088 B2 | 9/2022 | Watson et al. |
| 11,632,420 B2 | 4/2023 | Richardson et al. |
| 11,729,294 B2 | 8/2023 | Watson |
| 11,811,657 B2 | 11/2023 | Richardson et al. |
| 11,863,417 B2 | 1/2024 | Howard et al. |
| 12,273,428 B2 | 4/2025 | Watson |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1* | 12/2001 | Skene .............. H04L 61/4511 709/232 |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007404 A1 | 1/2002 | Vange et al. |
| 2002/0007413 A1 | 1/2002 | Garcia-Luna-Aceves et al. |
| 2002/0009079 A1 | 1/2002 | Jungck et al. |
| 2002/0010783 A1 | 1/2002 | Primak et al. |
| 2002/0010798 A1 | 1/2002 | Ben-Shaul et al. |
| 2002/0013823 A1 | 1/2002 | Eubanks |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |

(56) References Cited

U.S. PATENT DOCUMENTS

| | | |
|---|---|---|
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083175 A1 | 6/2002 | Afek et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087726 A1 | 7/2002 | Macpherson et al. |
| 2002/0087797 A1 | 7/2002 | Adrangi |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133601 A1 | 9/2002 | Kennamer et al. |
| 2002/0133741 A1 | 9/2002 | Maeda et al. |
| 2002/0135611 A1 | 9/2002 | Deosaran et al. |
| 2002/0138286 A1* | 9/2002 | Engstrom ........... G06Q 30/0601 705/26.1 |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009562 A1 | 1/2003 | Heymann et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0093691 A1 | 5/2003 | Simon et al. |
| 2003/0097564 A1 | 5/2003 | Tewari et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135468 A1 | 7/2003 | Barbir et al. |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1* | 8/2003 | Chaudhri ............... G06Q 30/06 705/26.1 |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0204742 A1 | 10/2003 | Gupta et al. |
| 2003/0206520 A1 | 11/2003 | Wu et al. |
| 2003/0221000 A1 | 11/2003 | Cherkasova et al. |
| 2003/0225893 A1 | 12/2003 | Roese et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan et al. |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0019781 A1 | 1/2004 | Chari et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |

(56) References Cited

U.S. PATENT DOCUMENTS

| | | |
|---|---|---|
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0098478 A1 | 5/2004 | Koetke et al. |
| 2004/0105544 A1 | 6/2004 | Haneda et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1* | 7/2004 | Trossen .............. H04L 67/51 709/227 |
| 2004/0128346 A1 | 7/2004 | Melamed et al. |
| 2004/0143595 A1 | 7/2004 | Cherkasova |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truty |
| 2004/0267907 A1 | 12/2004 | Gustafsson |
| 2005/0004945 A1 | 1/2005 | Cossins et al. |
| 2005/0004985 A1 | 1/2005 | Stochosky |
| 2005/0010653 A1 | 1/2005 | McCanne |
| 2005/0010961 A1 | 1/2005 | Hagen et al. |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0076137 A1 | 4/2005 | Tang et al. |
| 2005/0097445 A1 | 5/2005 | Day et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0120133 A1 | 6/2005 | Slack-Smith |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0192814 A1 | 9/2005 | Challener et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1* | 12/2005 | Gunaseelan .......... G06Q 10/10 705/59 |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0020807 A1 | 1/2006 | Aura et al. |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0026592 A1 | 2/2006 | Simonen et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0136487 A1 | 6/2006 | Kim et al. |
| 2006/0143293 A1 | 6/2006 | Freedman |
| 2006/0143442 A1 | 6/2006 | Smith |

(56) References Cited

U.S. PATENT DOCUMENTS

| | | |
|---|---|---|
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1* | 7/2006 | Leighton ............ H04L 67/1021 709/207 |
| 2006/0168240 A1 | 7/2006 | Olshefski |
| 2006/0173855 A1 | 8/2006 | Turner et al. |
| 2006/0173957 A1 | 8/2006 | Robinson et al. |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 10/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0235941 A1 | 10/2006 | Arcas et al. |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282505 A1 | 12/2006 | Hasha et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0195800 A1 | 8/2007 | Yang et al. |
| 2007/0198982 A1 | 8/2007 | Bolan et al. |
| 2007/0204107 A1 | 8/2007 | Greenfield et al. |
| 2007/0208737 A1* | 9/2007 | Li ............................ H04L 67/55 |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 12/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0005275 A1 | 1/2008 | Overton et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0028463 A1 | 1/2008 | Dagon et al. |
| 2008/0037442 A1* | 2/2008 | Bill ............................ H04W 40/24 370/254 |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071925 A1 | 3/2008 | Leighton et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |

(56) References Cited

U.S. PATENT DOCUMENTS

| | | |
|---|---|---|
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0175222 A1 | 7/2008 | Barnea et al. |
| 2008/0184357 A1 | 7/2008 | Drako et al. |
| 2008/0189437 A1 | 8/2008 | Halley |
| 2008/0201332 A1 | 8/2008 | Souders et al. |
| 2008/0201401 A1 | 8/2008 | Pugh et al. |
| 2008/0201711 A1 | 8/2008 | Amir Husain |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |
| 2008/0301670 A1* | 12/2008 | Gouge ................. G06F 8/65 717/173 |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0013321 A1 | 1/2009 | Mattiocco et al. |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0040927 A1 | 2/2009 | Tsun |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0109854 A1 | 4/2009 | Rajpathak |
| 2009/0112703 A1 | 4/2009 | Brown |
| 2009/0125393 A1 | 5/2009 | Hwang et al. |
| 2009/0125902 A1 | 5/2009 | Ghosh et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0144496 A1 | 6/2009 | Kawaguchi |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0157899 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0172167 A1 | 7/2009 | Drai et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1* | 8/2009 | Hudson ................. H04L 67/104 709/231 |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1* | 1/2010 | Swildens ................. H04L 47/745 709/226 |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034381 A1 | 2/2010 | Trace et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 4/2010 | Wood et al. |
| 2010/0082787 A1 | 4/2010 | Kommula et al. |
| 2010/0088367 A1 | 4/2010 | Brown et al. |

(56) References Cited

U.S. PATENT DOCUMENTS

| | | |
|---|---|---|
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0138921 A1 | 6/2010 | Na et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0235915 A1 | 9/2010 | Memon et al. |
| 2010/0250710 A1 | 9/2010 | Cadwell et al. |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 12/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge et al. |
| 2011/0016214 A1 | 1/2011 | Jackson |
| 2011/0029398 A1 | 2/2011 | Boudville |
| 2011/0029598 A1 | 2/2011 | Arnold et al. |
| 2011/0035469 A1 | 2/2011 | Smith et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0082916 A1 | 4/2011 | Swanson et al. |
| 2011/0085654 A1 | 4/2011 | Jana et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 5/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0202705 A1 | 8/2011 | Hayashi et al. |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0282988 A1 | 11/2011 | Wang et al. |
| 2011/0295940 A1 | 12/2011 | Saleem et al. |
| 2011/0295942 A1 | 12/2011 | Raghunath et al. |
| 2011/0296053 A1 | 12/2011 | Medved et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0005673 A1 | 1/2012 | Cervantes et al. |
| 2012/0011190 A1 | 1/2012 | Driesen et al. |
| 2012/0011509 A1 | 1/2012 | Husain |
| 2012/0014249 A1 | 1/2012 | Narendran |
| 2012/0023090 A1 | 1/2012 | Holloway et al. |
| 2012/0023226 A1 | 1/2012 | Petersen et al. |
| 2012/0031626 A1 | 2/2012 | Clayton et al. |
| 2012/0036238 A1 | 2/2012 | Sundaram et al. |
| 2012/0041899 A1 | 2/2012 | Greene et al. |
| 2012/0041970 A1 | 2/2012 | Ghosh et al. |
| 2012/0042381 A1 | 2/2012 | Antonakakis et al. |
| 2012/0054860 A1 | 3/2012 | Wyschogrod et al. |
| 2012/0066360 A1 | 3/2012 | Ghosh |
| 2012/0066681 A1 | 3/2012 | Levy et al. |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 4/2012 | Safruti et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |

(56) References Cited

U.S. PATENT DOCUMENTS

| | | |
|---|---|---|
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0204176 A1 | 8/2012 | Tian et al. |
| 2012/0209942 A1 | 8/2012 | Zehavi et al. |
| 2012/0221646 A1 | 8/2012 | Ciminiera et al. |
| 2012/0222005 A1 | 8/2012 | Harris et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0266231 A1 | 10/2012 | Spiers et al. |
| 2012/0272224 A1 | 10/2012 | Brackman |
| 2012/0278229 A1 | 11/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1 | 1/2013 | Li et al. |
| 2013/0018945 A1 | 1/2013 | Vendrow et al. |
| 2013/0019311 A1 | 1/2013 | Swildens et al. |
| 2013/0034099 A1 | 2/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0061306 A1 | 3/2013 | Sinn |
| 2013/0067530 A1 | 3/2013 | Spektor et al. |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0084898 A1 | 4/2013 | Li et al. |
| 2013/0086001 A1 | 4/2013 | Bhogal et al. |
| 2013/0089005 A1 | 4/2013 | Li et al. |
| 2013/0095806 A1 | 4/2013 | Salkintzis et al. |
| 2013/0103834 A1 | 4/2013 | Dzerve et al. |
| 2013/0111035 A1 | 5/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0132854 A1 | 5/2013 | Raleigh et al. |
| 2013/0133057 A1 | 5/2013 | Yoon et al. |
| 2013/0136138 A1 | 5/2013 | Miller et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0227559 A1 | 8/2013 | Tsirkin |
| 2013/0246567 A1 | 9/2013 | Green et al. |
| 2013/0247061 A1 | 9/2013 | Kiehn |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 11/2013 | Mankovski et al. |
| 2013/0305083 A1 | 11/2013 | Machida |
| 2013/0311555 A1 | 11/2013 | Laoutaris et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318525 A1 | 11/2013 | Palanisamy et al. |
| 2013/0339429 A1 | 12/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0032658 A1 | 1/2014 | Falls |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108474 A1 | 4/2014 | David et al. |
| 2014/0108672 A1 | 4/2014 | Ou et al. |
| 2014/0109095 A1 | 4/2014 | Farkash et al. |
| 2014/0119194 A1 | 5/2014 | Raciborski et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164584 A1 | 6/2014 | Joe et al. |
| 2014/0164817 A1 | 6/2014 | Bartholomy et al. |
| 2014/0165061 A1 | 6/2014 | Greene et al. |
| 2014/0172944 A1 | 6/2014 | Newton et al. |
| 2014/0181268 A1 | 6/2014 | Stevens et al. |
| 2014/0189069 A1 | 7/2014 | Gero et al. |
| 2014/0195686 A1 | 7/2014 | Yeager et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0324774 A1 | 10/2014 | Chen et al. |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2014/0365613 A1 | 12/2014 | Phillips |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0036493 A1 | 2/2015 | CJ et al. |

(56) References Cited

U.S. PATENT DOCUMENTS

| | | |
|---|---|---|
| 2015/0067171 A1 | 3/2015 | Yum |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 4/2015 | Bergman |
| 2015/0106864 A1 | 4/2015 | Li et al. |
| 2015/0130813 A1 | 5/2015 | Taraki et al. |
| 2015/0149600 A1 | 5/2015 | Thibeault et al. |
| 2015/0149631 A1 | 5/2015 | Lissack |
| 2015/0154051 A1 | 6/2015 | Kruglick |
| 2015/0156172 A1 | 6/2015 | Nandi et al. |
| 2015/0156279 A1 | 6/2015 | Vaswani et al. |
| 2015/0163273 A1 | 6/2015 | Radcliffe et al. |
| 2015/0180995 A1 | 6/2015 | Hofmann |
| 2015/0188734 A1 | 7/2015 | Petrov |
| 2015/0189042 A1 | 7/2015 | Sun et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0264009 A1 | 9/2015 | Scharber et al. |
| 2015/0271031 A1 | 9/2015 | Beevers |
| 2015/0281367 A1 | 10/2015 | Nygren et al. |
| 2015/0288647 A1 | 10/2015 | Chhabra et al. |
| 2015/0317118 A1 | 11/2015 | Orikasa et al. |
| 2015/0339136 A1 | 11/2015 | Suryanarayanan et al. |
| 2015/0341431 A1 | 11/2015 | Hartrick et al. |
| 2015/0347311 A1 | 12/2015 | Tanaka et al. |
| 2015/0350365 A1 | 12/2015 | Khakpour et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006645 A1 | 1/2016 | Rave |
| 2016/0006672 A1 | 1/2016 | Saavedra |
| 2016/0021197 A1 | 1/2016 | Pogrebinsky et al. |
| 2016/0028598 A1 | 1/2016 | Khakpour et al. |
| 2016/0028755 A1 | 1/2016 | Vasseur et al. |
| 2016/0036857 A1 | 2/2016 | Foxhoven et al. |
| 2016/0065475 A1 | 3/2016 | Hilt et al. |
| 2016/0072669 A1 | 3/2016 | Saavedra |
| 2016/0104346 A1 | 4/2016 | Ovalle et al. |
| 2016/0132600 A1 | 5/2016 | Woodhead et al. |
| 2016/0142251 A1 | 5/2016 | Contreras et al. |
| 2016/0164761 A1 | 6/2016 | Sathyanarayana et al. |
| 2016/0164799 A1 | 6/2016 | Popli et al. |
| 2016/0182454 A1 | 6/2016 | Phonsa et al. |
| 2016/0182542 A1 | 6/2016 | Staniford |
| 2016/0241639 A1 | 8/2016 | Brookins et al. |
| 2016/0253262 A1 | 9/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 10/2016 | Khakpour et al. |
| 2016/0337426 A1 | 11/2016 | Shribman et al. |
| 2016/0366202 A1 | 12/2016 | Phillips et al. |
| 2016/0373789 A1 | 12/2016 | Tsukagoshi |
| 2017/0024800 A1 | 1/2017 | Shah |
| 2017/0026338 A1 | 1/2017 | Leach et al. |
| 2017/0034254 A1 | 2/2017 | Salkintzis |
| 2017/0041333 A1 | 2/2017 | Mahjoub et al. |
| 2017/0041428 A1 | 2/2017 | Katsev |
| 2017/0099254 A1 | 4/2017 | Leach et al. |
| 2017/0099345 A1 | 4/2017 | Leach |
| 2017/0109316 A1 | 4/2017 | Hack et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0163425 A1 | 6/2017 | Kaliski, Jr. |
| 2017/0170973 A1 | 6/2017 | Gill et al. |
| 2017/0171146 A1 | 6/2017 | Sharma et al. |
| 2017/0180217 A1 | 6/2017 | Puchala et al. |
| 2017/0187768 A1 | 6/2017 | Huang et al. |
| 2017/0214761 A1 | 7/2017 | Hsu et al. |
| 2017/0223029 A1 | 8/2017 | Sharma et al. |
| 2017/0374121 A1 | 12/2017 | Phillips et al. |
| 2018/0011913 A1 | 1/2018 | Kapanipathi et al. |
| 2018/0027040 A1 | 1/2018 | Bae |
| 2018/0063193 A1 | 3/2018 | Chandrashekhar et al. |
| 2018/0077109 A1 | 3/2018 | Hoeme et al. |
| 2018/0077110 A1 | 3/2018 | Huston, III et al. |
| 2018/0088993 A1 | 3/2018 | Gerdesmeier et al. |
| 2018/0101324 A1 | 4/2018 | Sharma |
| 2018/0173526 A1 | 6/2018 | Prinsloo et al. |
| 2018/0176615 A1 | 6/2018 | Hannu et al. |
| 2018/0191817 A1 | 7/2018 | Richardson et al. |
| 2018/0337885 A1 | 11/2018 | Singh et al. |
| 2019/0044787 A1 | 2/2019 | Richardson et al. |
| 2019/0044846 A1 | 2/2019 | Howard et al. |
| 2019/0052518 A1 | 2/2019 | Gal et al. |
| 2019/0074982 A1 | 3/2019 | Hughes |
| 2019/0089818 A1 | 3/2019 | Choi |
| 2019/0129908 A1 | 5/2019 | Raftery |
| 2019/0140922 A1 | 5/2019 | Ellsworth et al. |
| 2019/0327510 A1 | 10/2019 | Kalagi et al. |
| 2020/0065132 A1 | 2/2020 | Mercier et al. |
| 2020/0193234 A1 | 6/2020 | Pai et al. |
| 2020/0265096 A1 | 8/2020 | Raftery |
| 2020/0349390 A1 | 11/2020 | Konwar et al. |
| 2020/0389541 A1 | 12/2020 | Baldwin et al. |
| 2021/0021692 A1 | 1/2021 | Richardson et al. |
| 2021/0042163 A1 | 2/2021 | Radhakrishnan et al. |
| 2021/0184958 A1 | 6/2021 | Kolar et al. |
| 2021/0185114 A1 | 6/2021 | Baldwin et al. |
| 2021/0367832 A1 | 11/2021 | Ramachandran et al. |
| 2022/0050814 A1 | 2/2022 | Alt et al. |
| 2022/0124110 A1 | 4/2022 | Chhabra |
| 2022/0156121 A1 | 5/2022 | Parthasarathy et al. |
| 2022/0172100 A1 | 6/2022 | Balasubramanian et al. |
| 2022/0174010 A1 | 6/2022 | Richardson et al. |
| 2022/0224767 A1 | 7/2022 | Watson |
| 2022/0272146 A1 | 8/2022 | Richardson et al. |
| 2022/0376994 A1 | 11/2022 | Mishra |
| 2022/0407933 A1 | 12/2022 | Swaminathan |
| 2023/0164050 A1 | 5/2023 | Howard |
| 2023/0254363 A1 | 8/2023 | Richardson |
| 2023/0362276 A1 | 11/2023 | Watson |

FOREIGN PATENT DOCUMENTS

| | | |
|---|---|---|
| CN | 1422468 A | 6/2003 |
| CN | 1511399 A | 7/2004 |
| CN | 1605182 A | 4/2005 |
| CN | 101189598 A | 5/2008 |
| CN | 101431539 A | 5/2009 |
| CN | 101460907 A | 6/2009 |
| CN | 101631133 A | 1/2010 |
| CN | 103152357 A | 6/2013 |
| CN | 103731481 A | 4/2014 |
| CN | 104995935 A | 10/2015 |
| DE | 60318825 T2 | 1/2009 |
| EP | 1603307 A2 | 12/2005 |
| EP | 1351141 A2 | 10/2007 |
| EP | 2008167 A2 | 12/2008 |
| EP | 3156911 A1 | 4/2017 |
| IN | 433288 | 5/2023 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |

(56) References Cited

FOREIGN PATENT DOCUMENTS

| | | |
|---|---|---|
| JP | 3748216 B2 | 2/2006 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2001/045349 A2 | 6/2001 |
| WO | WO 2001/055879 A1 | 8/2001 |
| WO | WO 2002/069608 A2 | 9/2002 |
| WO | WO 2004/006113 A1 | 1/2004 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2015/119606 A1 | 8/2015 |
| WO | WO 2017/106455 A1 | 6/2017 |
| WO | WO 2018/236597 A1 | 12/2018 |

OTHER PUBLICATIONS

"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet:URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java. net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass.Compute Ranch," Nov. 6, 2002, Sun Microsystems, Inc., retrieved May 3, 2006, from http://www.sun.com/smi/Press/sunflash/2002-11/sunflash.20021106.3 .XML, 2 pages.
"Sun N1 Grid Engine 6," Sun Microsystems, Inc., retrieved May 3, 2006, from http://www.sun.com/software/gridware/index.XML, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments,"Oct. 12, 2004, HP Laboratories Bristol, HPL-2004-171, retrieved Aug. 30, 2007, from http://www.hpl.hp.com/techreports/2004/HPL-2004-171.pdf, 14 pages.
Committee; Retrieved from the internet: (URL: American Bar Association; Digital Signature Guidelines Tutorial [online]; Feb. 10, 2002 [retrieved on Mar. 2, 2010]; American Bar Association Section of Science and Technology Information Security http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request forComments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login ;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006),pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on NetworkedSystems Design and Implementation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedingsof Saint 2001 Symposium On Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms For Replicated Database Maintenance," 1987, Proceedings of thesixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Frangoudis et al., "PTPv2-based network load estimation and its application to QoE monitoring for Over-the-Top services", IEEE,

(56) References Cited

OTHER PUBLICATIONS

The 5th International conference on Information, Intelligence, Systems and Applications, IISA 2014, XP032629858, Jul. 7, 2014, pp. 176-181.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al., "Measuring Round Trip Times to determine the Distance between WLAN Nodes", May 2005, in Proc. of Networking 2005, all pages.
Gunther et al., "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al., Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," inParallel and Distributed Processing Symposium, 2007. IPDPS 2007. IEEE International , vol. No., pp. 1-6, Mar. 26-30, 2007.
Ioannidis, S., et al., "Implementing a Distributed Firewall," Nov. 2000, (ACM) Proceedings of theACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedingsof the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDOS Attacks", Retrieved fromhttp://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," TechnicalReport of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual MachinePlacement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use";Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved fromhttp://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al., "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on The Grid," Report of Study of InformationProcessing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust And Scalable Technology for Distributed System Monitoring,Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study ofInformation Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, "Report of Study of Information Processing Society of Japan, Information Processing Society, vol. 2006, No. 20, pp. 127-132, Japan, Feb. 28, 2006.
Department of Computer Zaman et al., "Combinatorial Auction-Based Dynamic VM Provisioning and Allocation in Clouds", Science, Wayne State University, Sep. 2011 http://www.cs.wayne.edu/-dgrosu/pub/ccgrid12-symp.pdf.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, mailed Oct. 12, 2011 in 11 pages.

(56) References Cited

OTHER PUBLICATIONS

Supplementary European Search Report in Application No. 09727694.3 mailed Jan. 30, 2012 in 6 pages.
Singapore Examination Report in Application No. 201006837-7 mailed Mar. 16, 2012.
First Office Action in Chinese Application No. 200980111426.1 mailed Feb. 16, 2013.
Second Office Action in Chinese Application No. 200980111426.1 mailed Dec. 25, 2013.
Third Office Action in Chinese Application No. 200980111426.1 mailed Jul. 7, 2014.
Fourth Office Action in Chinese Application No. 200980111426.1 mailed Jan. 15, 2015.
Fifth Office Action in Chinese Application No. 200980111426.1 mailed Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 mailed Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 mailed on Oct. 12, 2011.
Examination Report in Indian Application No. 6213/CHENP/2010 mailed May 23, 2018.
First Office Action is Chinese Application No. 200980125551.8 mailed Jul. 4, 2012.
First Office Action in Japanese Application No. 2011-516466 mailed Mar. 6, 2013.
Second Office Action in Japanese Application No. 2011-516466 mailed Mar. 17, 2014.
Decision of Refusal in Japanese Application No. 2011-516466 mailed Jan. 16, 2015.
Office Action in Japanese Application No. 2011-516466 mailed May 30, 2016.
Office Action in Canadian Application No. 2726915 dated May 13, 2013.
First Office Action in Korean Application No. 10-2011-7002461 mailed May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Extended Search Report in European Application No. 19184826.6 dated Jan. 17, 2020.
Search Report and Written Opinion in Singapore Application No. 201103333-9 mailed Nov. 19, 2012.
Examination Report in Singapore Application No. 201103333-9 dated Aug. 13, 2013.
Office Action in Chinese Application No. 201310717573.1 dated Jul. 29, 2016.
First Office Action in Chinese Applicaton No. 201610112984.1 dated Mar. 20, 2018.
Second Office Action in Chinese Applicaton No. 201610112984.1 dated Feb. 2, 2019.
Office Action in European Application No. 11767118.0 dated Feb. 3, 2017.
Office Action in European Application No. 11767118.0 dated Jul. 25, 2018.
Office Action in European Application No. 11767118.0 dated Jan. 29, 2019.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
Office Action in Japanese Application No. 2013-529454 mailed Mar. 9, 2015 in 8 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
First Office Action in Chinese Application No. 201180046104.0 mailed Nov. 3, 2014.
Second Office Action in Chinese Application No. 201180046104.0 mailed Sep. 29, 2015.
Third Office Action in Chinese Application No. 201180046104.0 mailed Apr. 14, 2016.
Decision of Rejection in Chinese Application No. 201180046104.0 dated Oct. 17, 2016.
Office Action in Chinese Application No. 201810426428.0 mailed Jul. 20, 2020 in 25 pages.
Examination Report in Singapore Application No. 201301573-0 mailed Dec. 22, 2014.
Examination Report in Indian Application No. 3105/DELNP/2013, dated Feb. 19, 2019.
International Preliminary Report on Patentability in PCT/US2011/061486 mailed May 22, 2013.
International Search Report and Written Opinion in PCT/US2011/061486 mailed Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Second Office Action in Chinese Application No. 201610828846.3 dated Aug. 5, 2020.
Office Action in Japanese Application No. 2013-540982 dated Jun. 2, 2014.

(56) References Cited

OTHER PUBLICATIONS

Written Opinion in Singapore Application No. 201303521-7 dated May 20, 2014.
Extended Search Report in European Application No. 18156163 dated Sep. 3, 2018.
Examination Report in Indian Application No. 4487/DELNP/2013 dated Dec. 28, 2018.
Examination Report in Indian Application No. 201918034730 dated Mar. 9, 2022 in 7 pages.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
Office Action in European Application No. 13770602.4 dated Mar. 11, 2019.
Office Action in Indian Application No. 2823/DELNP/2015 dated Oct. 25, 2019.
Office Action in Brazilian Application No. BR112015005588-5 dated Jan. 14, 2020.
Supplementary Examination Report in Singapore Application No. 10201705920S dated Dec. 24, 2021.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.
Office Action in Japanese Application No. 2013-123086 mailed Dec. 2, 2014 in 4 pages.
Office Action in Japanese Application No. 2015-075644 mailed Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 mailed May 1, 2017.
International Preliminary Report on Patentability in PCT/US/2016/066848 mailed Jun. 19, 2018.
Partial Search Report in European Application No. 16876655.8 May 15, 2019.
Extended European Search Report in Application No. 16876655.8 dated Aug. 20, 2019.
International Search Report and Written Opinion in PCT/US2017/055156 mailed Dec. 13, 2017.
International Preliminary Report on Patentability and Written Opinion in PCT/US2017/055156 mailed Apr. 9, 2019.
Office Action issued in connection with European Patent Application No. 18734734 mailed on Oct. 19, 2020.
International Search Report and Written Opinion in PCT/US2018/036634 mailed Sep. 11, 2018.
International Preliminary Report on Patentability and Written Opinion in PCT/US2018/036634 mailed Dec. 24, 2019.
Afergan et al. (AU-2003248856-A1); Akamai Tech Inc; retrieved from FIT database. (Year: 2003).

* cited by examiner

REQUEST ROUTING BASED ON CLASS

CROSS-REFERENCE TO RELATED APPLICATIONS

This application is a continuation of U.S. patent application Ser. No. 17/933,433, now U.S. Pat. No. 11,909,639, entitled "REQUEST ROUTING BASED ON CLASS" and filed on Sep. 19, 2022, which in turn is a continuation of U.S. patent application Ser. No. 16/948,889, now U.S. Pat. No. 11,451,472, entitled "REQUEST ROUTING BASED ON CLASS" and filed Oct. 5, 2020, which in turn is a continuation of U.S. patent application Ser. No. 16/405,779, now U.S. Pat. No. 10,797,995, entitled "REQUEST ROUTING BASED ON CLASS" and filed May 7, 2019, which in turn is a continuation of U.S. patent application Ser. No. 15/888,860, now U.S. Pat. No. 10,305,797, entitled "REQUEST ROUTING BASED ON CLASS" and filed Feb. 5, 2018, which in turn is a continuation of U.S. patent application Ser. No. 15/408,362, now U.S. Pat. No. 9,887,915, entitled "REQUEST ROUTING BASED ON CLASS" and filed Jan. 17, 2017, which in turn is a continuation of U.S. patent application Ser. No. 14/263,824, now U.S. Pat. No. 9,571,389, entitled "REQUEST ROUTING BASED ON CLASS" and filed Apr. 28, 2014, which in turn is a continuation of U.S. patent application Ser. No. 13/766,574, now U.S. Pat. No. 8,713,156, entitled "REQUEST ROUTING BASED ON CLASS" and filed Feb. 13, 2013, which in turn is a continuation of U.S. patent application Ser. No. 13/418,239, now U.S. Pat. No. 8,386,596, entitled "REQUEST ROUTING BASED ON CLASS" and filed Mar. 12, 2012, which in turn is a continuation of U.S. patent application Ser. No. 13/098,366, now U.S. Pat. No. 8,135,820, entitled "REQUEST ROUTING BASED ON CLASS" and filed Apr. 29, 2011, which in turn is a continuation of U.S. patent application Ser. No. 12/060,173, now U.S. Pat. No. 7,962,597, entitled "REQUEST ROUTING BASED ON CLASS" and filed Mar. 31, 2008, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the management and processing of resource requests made to a content delivery network ("CDN") service provider from client computing devices. Specifically, aspects of the disclosure will be described with regard to routing information associated with a resource request based on routing information for a cluster of client computing devices. Although various aspects of the disclosure will be described with regard to illustrative examples and embodiments, one skilled in the art will appreciate that the disclosed embodiments and examples should not be construed as limiting.

Figure 1:
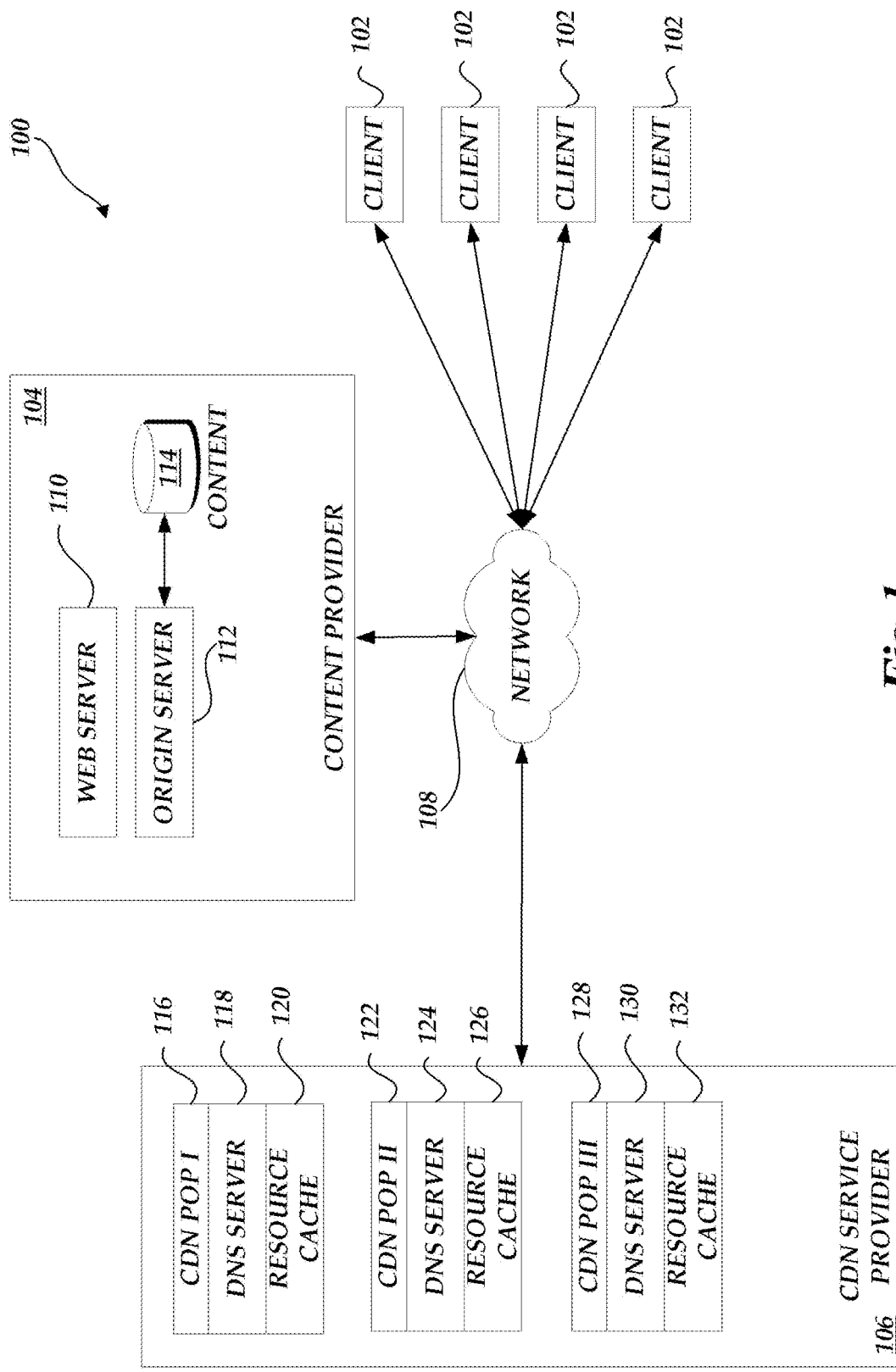
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPS will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
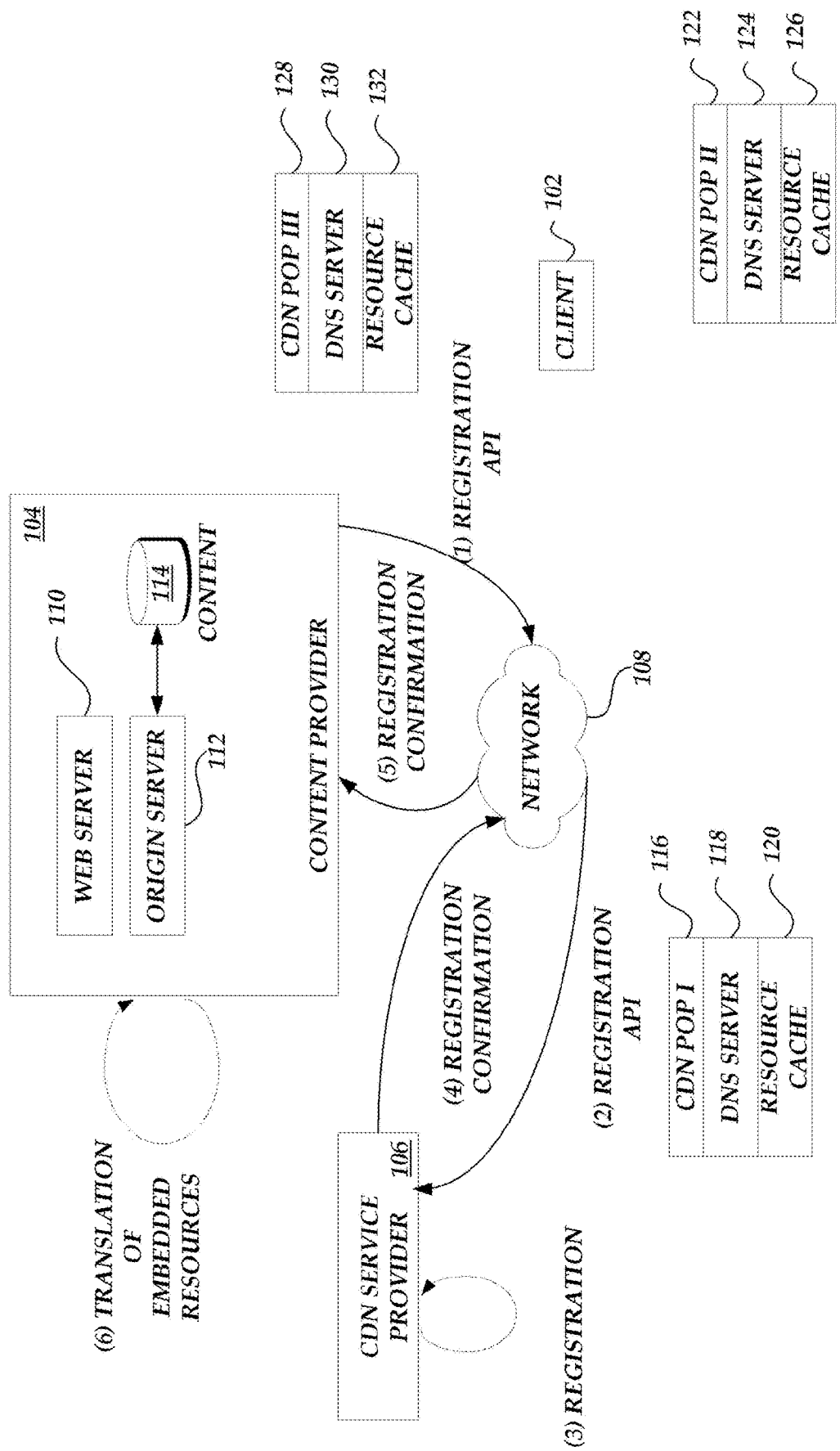
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additionalinformation.cdnprovider.com/path/resources.xxx

Figure 3:
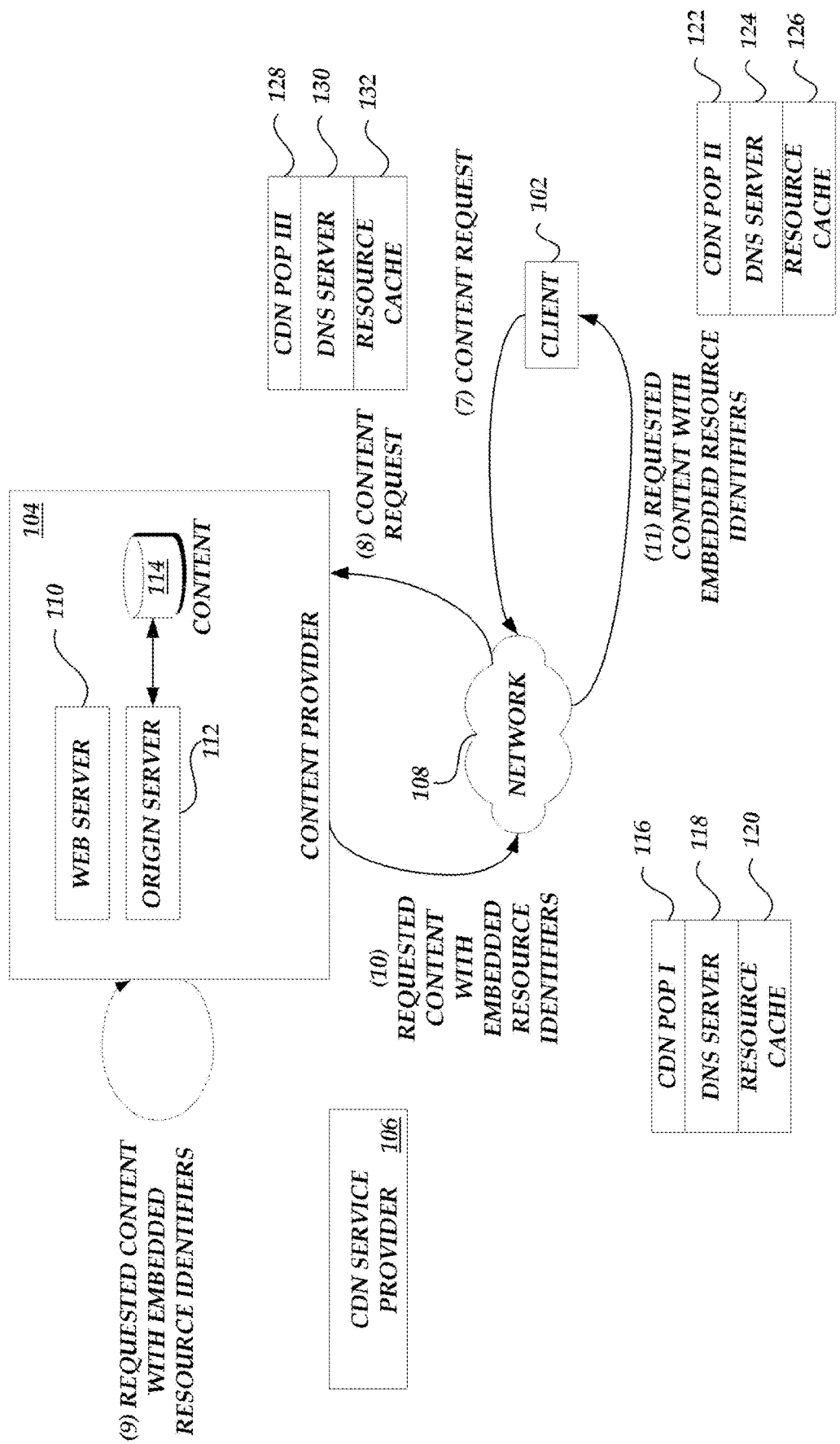
FIG. 3 is a block diagram of the content delivery environment of FIG. 1 illustrating the generation and processing of a content request from a client computing device to a content provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additionalinformation.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the Original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the "cdnprovider" portion of the embedded URL. The issuance of DNS queries corresponding to the "." and the "com" portions of a URL are well known and have not been illustrated.

Figure 4:
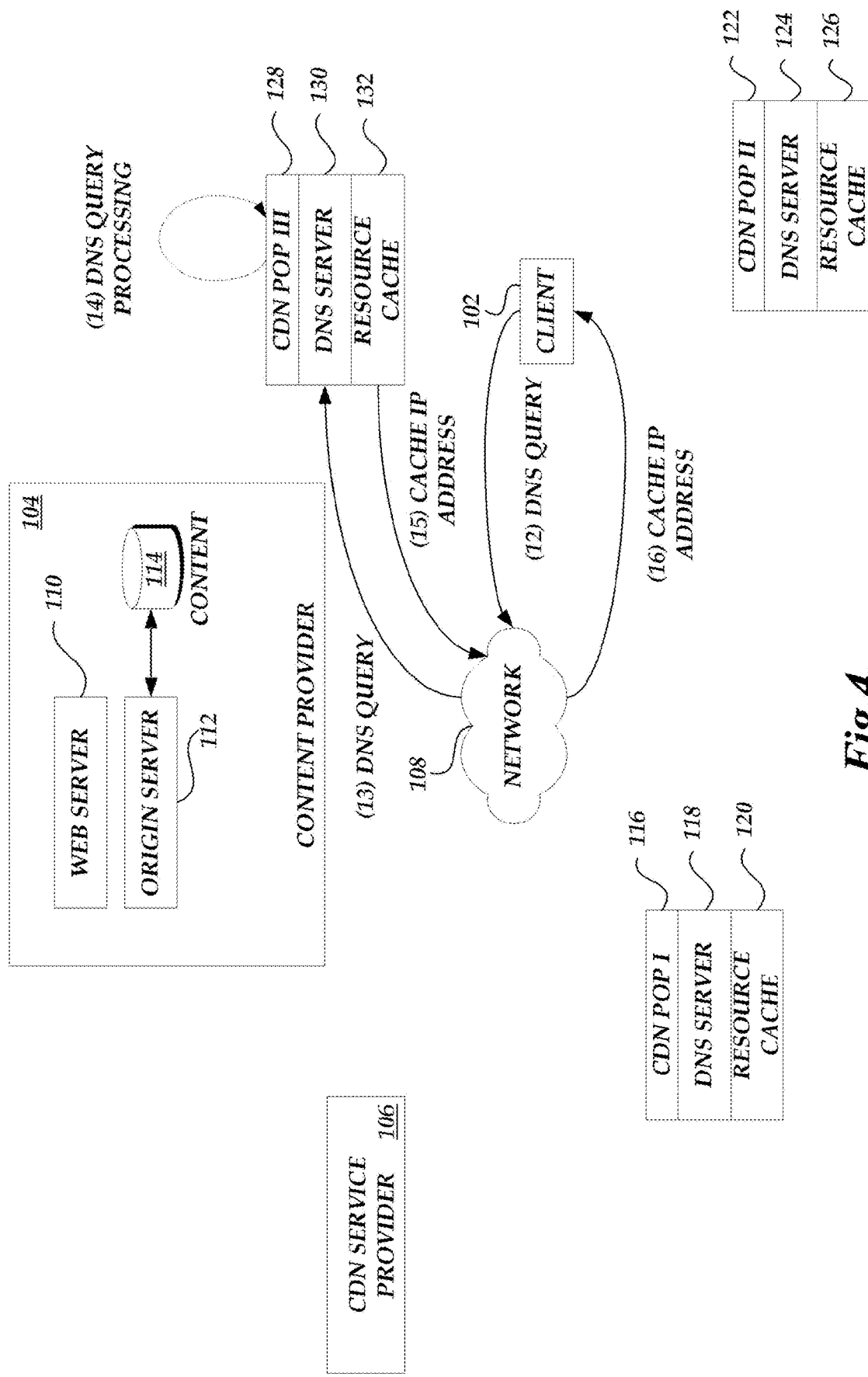
FIG. 4 is a block diagram of the content delivery environment of FIG. 1 illustrating one embodiment of the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying an IP address of a cache server component that will process the request for the requested resource. As described above and as will be described further below in reference to FIG. 6, a selected resource cache component can process the request by either providing the requested resource if it is available or attempt to obtain the requested resource from another source, such as a peer cache server computing device or the origin server 112 of the content provider 104.

In further reference to FIG. 4, the specific DNS server can utilize a variety of information in selecting a resource cache component. In an illustrative embodiment, and as will be further described below in reference to FIGS. 7 and 8, the DNS server determines a class associated with the requesting client computing device. For example, the class can correspond to a specific geographic region to which the client computing device belongs or an internet service provider for the client computing device. Such class information can be determined from the client directly (such as information provided by the client computing device or ISP) or indirectly (such as inferred through a client computing device's IP address). Based on the class, the DNS server determines appropriate routing information. Then, for embodiments described specifically in reference to FIG. 4, the DNS server selects an appropriate resource cache component for providing content associated with the resource request based on the routing information for the determined class of the client computing device. The IP address selected by the DNS server may correspond to a specific caching server in the resource cache. Alternatively, the IP address can correspond to a hardware/software selection component (such as a load balancer). As will also be further described below, the DNS server can further utilize network performance measurements to assist in selecting specific resource cache components for the determined class.

Figure 5A:
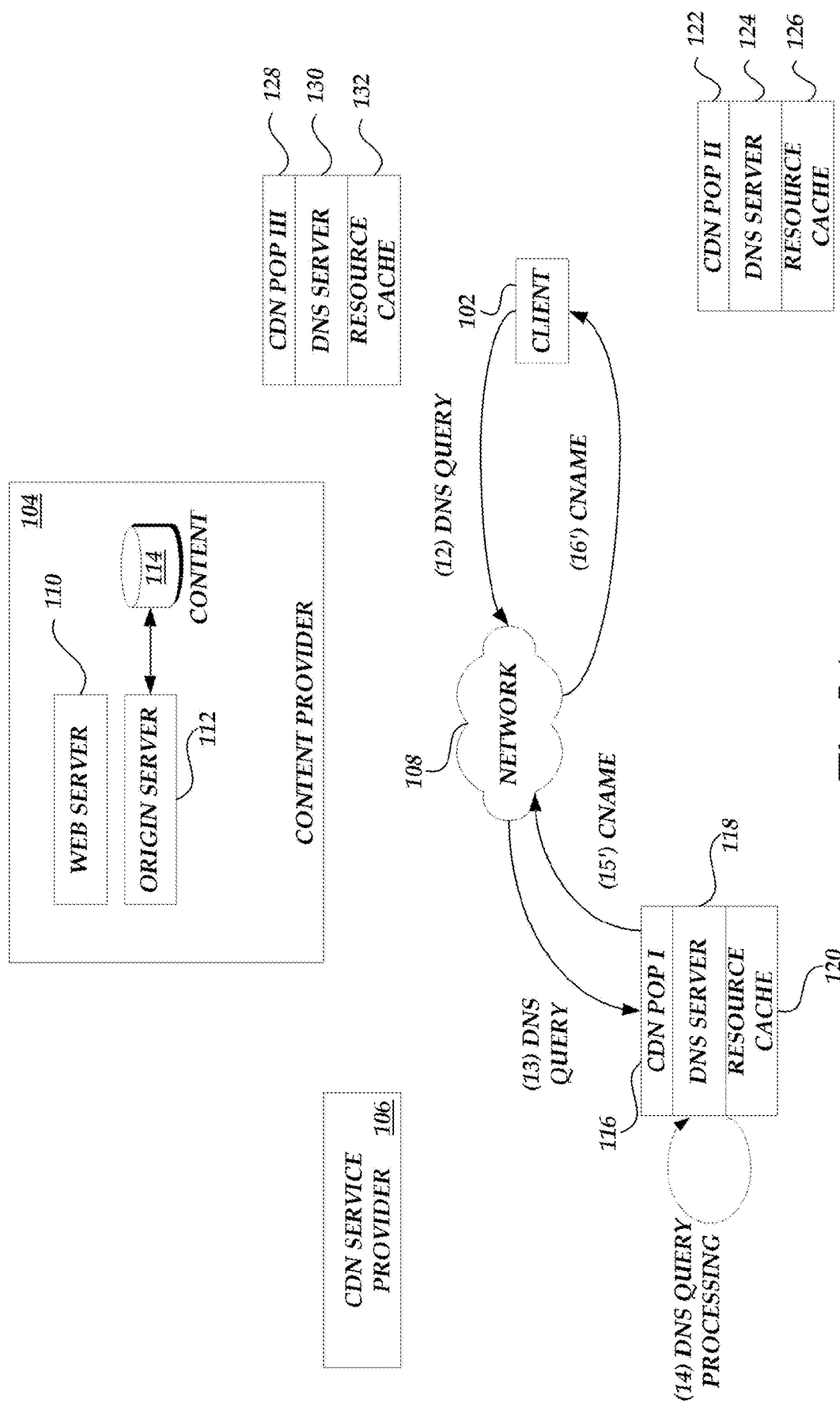
FIGS. 5A-5C are block diagrams of the content delivery environment of FIG. 1 illustrating another embodiment of the generation and processing of a DNS query corresponding to an embedded resource from a client computing device to a content delivery network service provider and the subsequent generation and processing of DNS queries corresponding to a first and a second alternative resource identifier from a client computing device to a content delivery network.
Figure 5B:
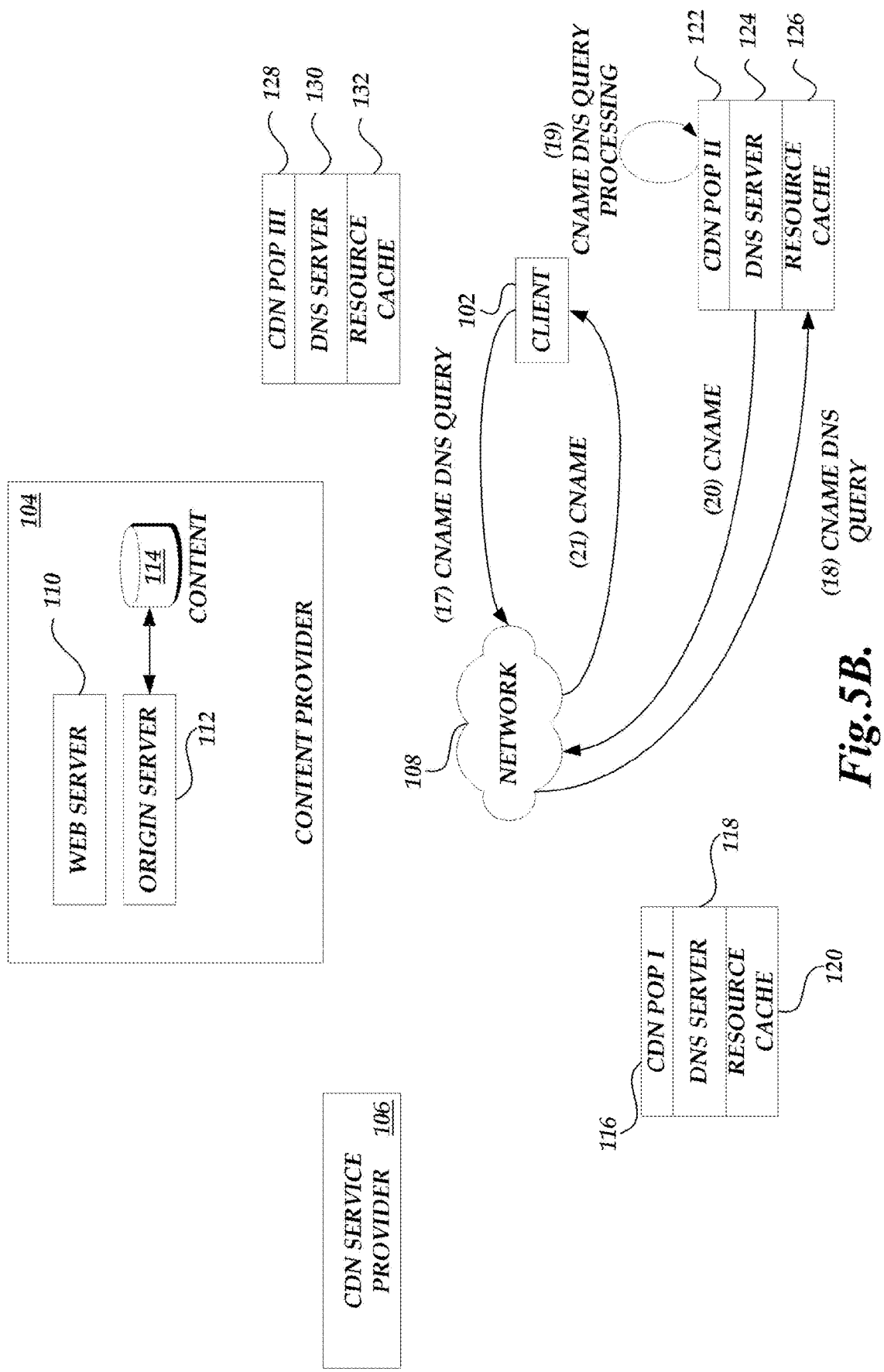
Figure 5C:
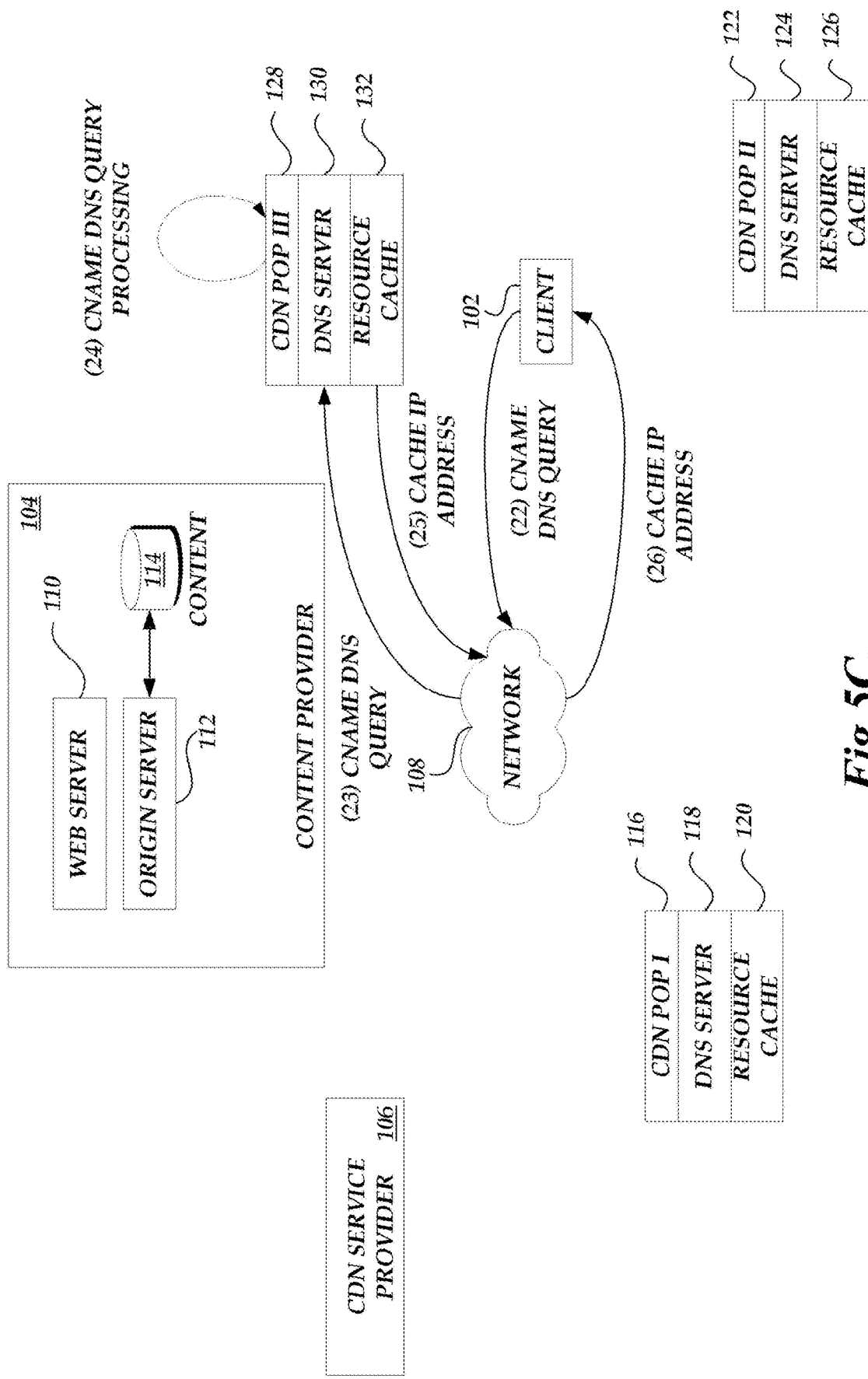

With reference now to FIGS. 5A-5C, as an alternative to selecting a resource cache component upon receipt of a DNS query as described in reference to FIG. 4, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

http://request_routing_information.cdnprovider.com

In an illustrative embodiment, the CNAME records are generated and provided by the DNS servers to identify a more appropriate DNS server of the CDN service provider 106. As with selecting an appropriate resource cache component as described above in reference to FIG. 4, the DNS server receiving the initial DNS query can utilize a variety of information to select a more appropriate DNS server of the CDN service provider 106 to resolve the resource request. In an illustrative embodiment, and as will also be further described below in reference to FIGS. 7 and 8, the DNS server determines a class associated with the requesting client computing device. Again, the class can, for example, correspond to a specific geographic region to which the client computing device belongs or an internet service provider for the client computing device. In any case, the DNS server may obtain class information from the client directly (such as information provided by the client computing device or ISP) or indirectly (such as inferred through a client computing device's IP address). Based on the class, the DNS server determines appropriate routing information. Then, for the embodiments described specifically in reference to FIG. 5A, the DNS server selects an appropriate alternative DNS server for use in resolving the resource request based on the routing information for the determined class of the client computing device. As will also be further described below, the DNS server can further utilize network performance measurements to select specific alternative DNS servers for the determined class.

In accordance with an illustrative embodiment, the DNS server maintains a data store that defines CNAME records for various original URLs. If a DNS query corresponding to a particular original URL matches an entry in the data store, the DNS server returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server, either directly or via a network-based service, selects one of the CNAME records defined in the data store as more appropriate routing information based on logic that factors a determined class of the requesting client computing device. It will be appreciated by one skilled in the art and others that the DNS server can implement further additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have POP specific data stores that define CNAME records, which can be managed centrally by the CDN service provider 106 or locally at the POP 116, 122, 128. Still further, each DNS server computing device within the DNS server components 118, 124, 130 can utilize shared data stores managed by a respective POP or a local data store specific to an individual DNS server computing device.

The returned CNAME can also include request routing information that is different from or in addition to the information provided in URL/CNAME of the current DNS query. For example, if the CNAME selection is based on a class associated with the requesting client computing device, a specific class can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on a regional plan, a specific regional plan domain (e.g., "cdn-provider-region1.com") could be used in the domain name portion of the specific CNAME record. Any additional request routing information can be prepended to the existing request routing information in the current URL/CNAME such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is selected by the DNS server component 118.

With continued reference to FIG. 5A, one skilled in the relevant art will appreciate that the DNS server may select (or otherwise obtain) a CNAME record that is intended to resolve to a more appropriate DNS server of the CDN service provider 106. It may be possible, however, that the same DNS server would also be authoritative for the subsequent DNS query for the CNAME to be provided to the client computing device. For example, a specific DNS server may be authoritative for both a specific regional plan and a service level plan. Thus, returning a CNAME would still result in the DNS query arriving at the same DNS query (which may also be due in part to the client computing device's geography). In such an embodiment, the DNS server, such as DNS server component 118, may choose to resolve the future DNS query in advance.

With reference now to FIG. 5B, upon receipt of the CNAME from the DNS server component 118, the client computing device 102 generates a subsequent DNS query corresponding to the CNAME. As previously discussed with regard to FIG. 4, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 5A) and the previous URL/CNAME share common CDN service provider domains, the current CNAME DNS query resolves to a different POP provided by the CDN service provider 106. As illustrated in FIG. 5B, the DNS server component 124 of POP 122 receives the current CNAME based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manners described above.

For purposes of illustration, assume that the DNS server component 118 determines that the DNS query corresponding to the current CNAME (provided by DNS server component 116) also corresponds to a CNAME record in its data store. In such an example, the DNS server component 124 would do any necessary processing to select a specific CNAME as described above and return the CNAME to the client computing device. With reference now to FIG. 5C, the client computing device 102 would now transmit a second subsequent DNS query corresponding to the CNAME provided by DNS server component 124 (FIG. 5B). In accordance with DNS query processes already described, the DNS query would illustratively be received by the DNS server component 130 of POP 128. Again, the DNS server component 130 can then determine whether to resolve the DNS query on the CNAME with an IP address of a cache component that will process the content request or whether to provide another alternative resource identifier selected in the manners described above. In this example, the DNS server component 130 returns an IP address.

With continued reference to FIG. 5C, in an illustrative embodiment, the DNS server components, such as DNS server component 130, can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. Yet further, the DNS server components can select a resource cache component based on routing information for a class of the requesting client computing device as described in reference to FIG. 4. Again, the IP address selected by a DNS server component may correspond to a specific caching server in the resource cache. Alternatively, the IP address can correspond to a hardware/software selection component (such as a load balancer).

Figure 6:
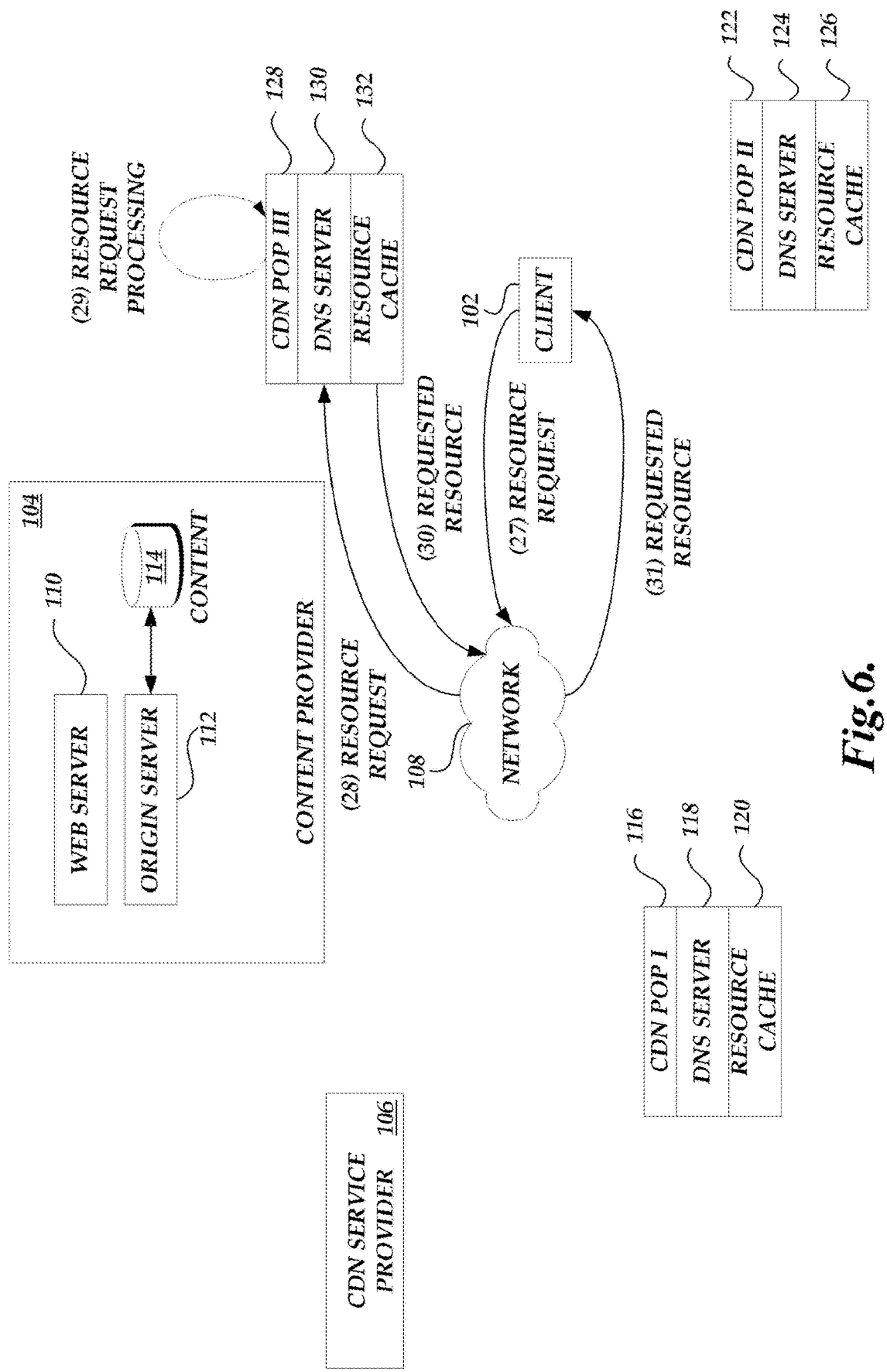
FIG. 6 is a block diagram of the content delivery environment of FIG. 1 illustrating the generation and processing of embedded resource requests from a client computing device to a content delivery network service provider.

With reference now to FIG. 6, in an illustrative example, assume that the DNS server component 130 has selected the resource cache component 132 of POP 128. Upon receipt of the IP address for the resource cache component 132, the client computing device 102 transmits requests for the requested content to the resource cache component 132. The resource cache component 132 processes the request in a manner described above and the requested content is transmitted to the client computing device 102.

Figure 7:
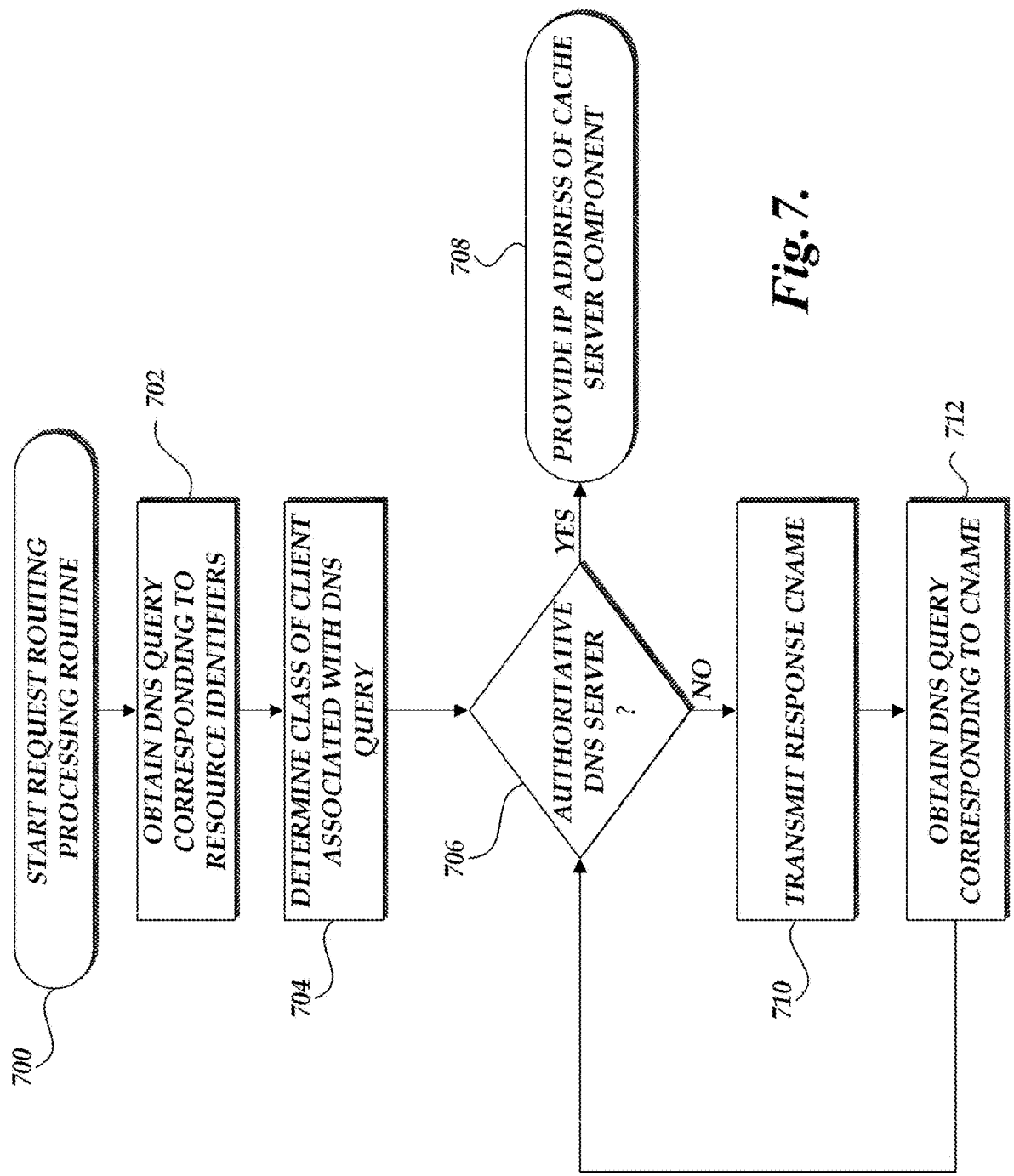
FIG. 7 is a flow diagram illustrative of a request routing routine implemented by a content delivery network service provider for selecting a cache server component.

With reference now to FIG. 7, one embodiment of a routine 700 implemented by the CDN service provider 106 for processing a resource request will be described. One skilled in the relevant art will appreciate that actions/steps outlined for routine 700 may be implemented by one or many computing devices/components that are associated with the CDN service provider 106. Accordingly, routine 700 has been logically associated as being generally performed by the CDN service provider 106, and thus the following illustrative embodiments should not be construed as limiting.

Routine 700 can apply to embodiments described both in reference to FIG. 4 and FIGS. 5A-5C. As such, routine 700 will first be described in reference to embodiments corresponding to selecting resource cache components at DNS servers based on routing information for a class of the requesting client computing device, as generally described in reference to FIG. 4.

At block 702, one of the DNS server components 118, 124, 130 receives a DNS query corresponding to a resource identifier. As previously discussed, the resource identifier can be a URL that has been embedded in content requested by the client computing device 102 and previously provided by the content provider 104. The DNS server determines a class of the requesting client associate with the DNS query at block 704. As mentioned above, the class can, for example, correspond to a specific geographic region to which the client computing device belongs or an internet service provider for the client computing device. Such class information can be determined from the client directly (such as information provided by the client computing device or ISP) or indirectly (such as inferred through a client computing device's IP address). In an illustrative embodiment, the determination of class at block 704 can specifically include associating the requesting client computing device to a cluster of other client computing devices based on a variety of criteria. Such criteria can include geographic region and internet service provider data, as mentioned above, in addition to routing path information, networking equipment, client sponsored service level agreements, content provider service level agreements, and the like.

At a decision block 706, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. In this illustrative embodiment, there are no CNAME records. Accordingly, the routine continues at block 708 where, in general, the current DNS server determines routing information for the determined class. Specifically, in an illustrative embodiment, the DNS server selects an appropriate resource cache component for providing content associated with the resource request based on routing information for the determined class of the client computing device. The DNS server then provides the IP address of the selected resource cache component to the client computing device.

In an illustrative embodiment, the routing information can be a list of resource cache components that can service the content request for a particular class of client computing devices. The DNS server can use a variety of logic to select a resource cache component from the list. In one embodiment, a probability of selecting each resource cache component on the list can be defined, and the DNS server selects a resource cache component based on these probabilities. Accordingly, in this illustrative embodiment, a DNS server will select a resource cache component on a frequency corresponding to the determined probabilities. For example, the DNS server will most frequently select the resource cache component with the highest probability of selection, but can also, at times, select a resource cache component with a lower probability of selection. In this case, the probabilities correspond to anticipated performance of the selected computing device. As will be described further below, the CDN service provider 106 can monitor performance of delivering requested resources to clients in a particular class and thereafter update the routing information (e.g., probabilities) accordingly. In another embodiment, the probabilities can correspond to load shedding or other network traffic mitigation. By periodically selecting a non-preferred resource cache component and monitoring its performance for the class, the CDN service provider 106 can thus determine if changes to the routing information for the class are desirable.

It will be appreciated by one skilled in the relevant art that a number of algorithms or selection logic can be used for selecting a resource cache component to service the resource request from a particular class of client computing devices. For example, in addition to the frequency-based reinforcement algorithm described above, the DNS server may implement alternative reinforcement learning algorithms. Examples of other reinforcement algorithms include, but are not limited to, algorithms such as State-Action-Reward-State-Action (SARSA), Q-learning, delayed Q-learning, and the like. Additionally, other machine learning approaches, such as support vector machines, neural networks, Bayesian engines, etc. may be utilized in conjunction with a DNS server to select the appropriate resource cache component.

Next, embodiments in which routing information for a class of the requesting client computing device is used to select an appropriate DNS server for processing the request will be described. In such embodiments, routine 700 similarly commences at block 702 where one of the DNS server components 118, 124, 130 receives a DNS query corresponding to a resource identifier. As described above, the DNS server further determines a class of the requesting client computing device associated with the DNS query at block 704.

At decision block 706, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. Alternative or additional methodologies may also be practiced to determine whether the DNS server is authoritative.

If the current DNS server is authoritative (including a determination that the same DNS server will be authoritative for subsequent DNS queries), the current DNS server resolves the DNS query by returning the IP address of cache server component. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 704 the DNS server is not authoritative, at block 708, the DNS server component selects and transmits an alternative resource identifier. As described above, the DNS server component can utilize a data store to identify a set of potential candidate CNAMES as a function of the current DNS query. The DNS server then, either directly or via a network-based service, selects one of the CNAME records defined in the data store as more appropriate routing information based on logic that factors a determined class of the requesting client computing device. At block 710, different DNS server components 118, 124, 130 receive a DNS query corresponding to the CNAME. The routine 700 then returns to decision block 704 and continues to repeat as appropriate.

In an illustrative embodiment, where the DNS server is not authoritative, the routing information can be a set or list of potential candidate CNAMES which correspond to one or more DNS servers that can service the content request for a particular class of client computing devices. Similar to selecting a cache resource component as described above, the DNS server can use a variety of logic to select a CNAME, or another DNS server, from the list. In one embodiment, a probability of selecting each CNAME in the set can be initially defined in a number of ways, and the DNS server selects a CNAME based on the defined probabilities. Accordingly, in this illustrative embodiment, a DNS server will most frequently select the CNAME with the highest probability of selection, but can also, at times, select a CNAME with a lower probability of selection. In this case, the probabilities correspond to anticipated performance of the corresponding computing device. As will be described further below, the CDN service provider 106 can monitor performance of delivering requested resources to clients in a particular class and thereafter update the probabilities. Again, in further embodiments, the probabilities can correspond to load shedding or other network traffic mitigation. By periodically selecting a non-preferred CNAME and monitoring performance of the corresponding DNS server for the class, the CDN service provider 106 can thus determine if changes to the routing information for the class are desirable. It will be appreciated by one skilled in the relevant art that a number of algorithms or selection logic can be used for selecting a CNAME/DNS server to service the resource request from a particular class of client computing devices.

Figure 8:
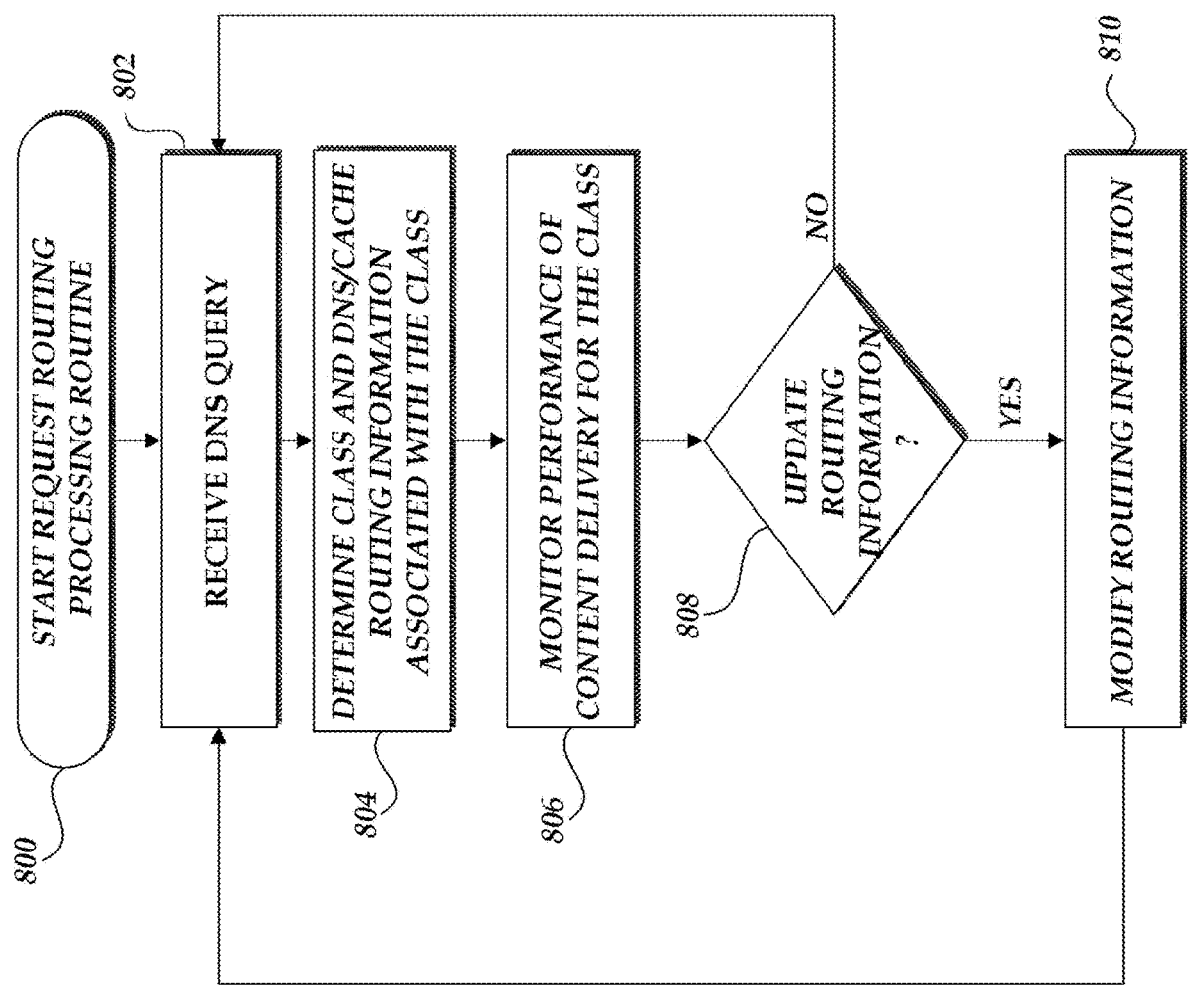
FIG. 8 is a flow diagram illustrative a request routing routine implemented by a content delivery network service provider for updating routing information.

With reference now to FIG. 8, one embodiment of a request routing routine 800 for updating routing information will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At a block 802, a first DNS server of the CDN service provider 106 receives a DNS query corresponding to a requested resource from a client computing device. As similarly described above in reference to block 704 of FIG. 7, the DNS server at block 804 determines a class corresponding to the requesting client and associated with the DNS query. Also at block 804, the DNS server determines either DNS or cache routing information based on the determined class of the client computing device as similarly described above. The routine 800 continues at block 806 where network performance criteria associated with delivery of the requested resource is monitored. The network performance criteria can correspond to measurements of network performance for transmitting data from the CDN service provider POPs to the client computing device 102. In one embodiment, network data transfer latencies associated with the delivery of the requested resource are measured by the client computing device 102. Alternatively, the CDN service provider 106, such as through the resource cache component, can measure the performance as part of providing content to a client computing device. Such network performance data can be managed and maintained globally by the CDN service provider and shared with the DNS servers of the CDN or individually by the DNS servers of the CDN service provider. Moreover, network performance criteria can be provided as a batch process from POPs or sent in response to a request from one POP to another.

With continued reference to FIG. 8, at a test block 808, a determination is made as to whether an update to the routing information for the identified class is needed based on the performance data. In one embodiment, the update determination can be made by the CDN service provider globally or by the individual DNS service components or DNS servers. In an illustrative embodiment where individual DNS servers determine whether to update routing information for a class, each DNS server can manage and maintain routing information for the identified class unique to the particular DNS server. In this illustrative embodiment, the performance data can be maintained globally by the CDN service provider and shared with the DNS components and/or DNS servers, with each DNS component and/or DNS server managing how the performance data is used. Accordingly, routing information for a class may vary from one DNS component/server to another.

Returning to FIG. 8, if an update is needed, the routing information for the identified class is modified at block 810. In one embodiment, the CDN service provider 106 modifies a list of computing devices (e.g. DNS components/servers and/or resource cache components) for servicing a resource request from a particular class of client computing devices 102. In another embodiment, the CDN service provider and/or specific DNS components/servers can maintain and modify probabilities of selection of particular computing devices for servicing a resource request for a class of client computing devices. For example, if performance data indicates that a DNS server and/or a resource cache component which has a lower probability of selection has performed well, the probability of selection may be increased so that the particular DNS server and/or resource cache component will be selected more frequently for servicing a resource request from a client computing device. After a modification has been made at block 810, or if an update is not needed at block 808, the routine 800 returns to block 802 for further processing as described above.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGUREs should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining, at a Domain Name System (DNS) server, a DNS query from a client computing device, wherein the DNS query is associated with a requested resource and corresponds to a uniform resource locator (URL);
   determining a class of the client computing device associated with the DNS query, wherein the class is included in the URL;
   selecting a cache component for providing the requested resource based on routing information for the class; and
   causing transmission of identification information for the cache component to the client computing device in response to the DNS query.

2. The computer-implemented method as recited in claim 1 further comprising monitoring performance associated with delivery of the requested resource using the cache component.

3. The computer-implemented method as recited in claim 2 further comprising modifying the routing information for the class based on the delivery performance of the requested resource using the cache component.

4. The computer-implemented method as recited in claim 3, wherein modifying the routing information for the class comprises modifying a list of cache components for processing the resource request for the class.

5. The computer-implemented method as recited in claim 4, wherein modifying the routing information for the class comprises modifying probabilities of selection of particular cache components used for processing the resource request for the class.

6. The computer-implemented method as recited in claim 1, wherein the routing information includes identification of a plurality of cache components.

7. The computer-implemented method as recited in claim 6, wherein the routing information includes information associated with a probability of selection of individual cache components.

8. The computer-implemented method as recited in claim 7, wherein selecting the cache component comprises selecting the cache component having a lower probability of selection.

9. The computer-implemented method as recited in claim 1, wherein the routing information includes a probability of selection of an individual cache component for delivery of the requested resource.

10. The computer-implemented method as recited in claim 1, wherein selecting the cache component is further based on load balancing criteria.

11. A system comprising:
    a first network point of presence (POP) of a content delivery network (CDN) service, wherein the first network POP includes a first Domain Name System (DNS) server that receives a first DNS query from a client computing device, wherein the first DNS query is associated with a requested resource and corresponds to a uniform resource locator (URL), and wherein the first DNS server in the first network POP is associated with a memory and operative for:
       determining a class of the client computing device associated with the first DNS query, wherein information identifying the class is included in the URL;
       selecting a cache component for providing the requested resource based on routing information for the class; and
       causing transmission of identification information for the cache component to the client computing device in response to the first DNS query.

12. The system as recited in claim 11 further comprising monitoring performance associated with delivery of the requested resource using the cache component.

13. The system as recited in claim 12 further comprising modifying the routing information for the class based on the delivery performance of the requested resource using the cache component.

14. The system as recited in claim 13, wherein modifying the routing information for the class comprises modifying a list of cache components for processing the resource request for the class.

15. The system as recited in claim 14, wherein modifying the routing information for the class comprises modifying probabilities of selection of particular cache components used for processing the resource request for the class.

16. The system as recited in claim 11, wherein the routing information includes identification of a plurality of cache components.

17. The system as recited in claim 16, wherein the routing information includes information associated with a probability of selection of individual cache components.

18. The system as recited in claim 17, wherein selecting the cache component comprises selecting the cache component having a lower probability of selection.

19. The system as recited in claim 11, wherein the routing information includes a probability of selection of an individual cache component for delivery of the requested resource.

20. The system as recited in claim 11, wherein selecting the cache component is further based on load balancing criteria.

* * * * *